United States Patent
Strasman et al.

(10) Patent No.: US 7,764,863 B1
(45) Date of Patent: Jul. 27, 2010

(54) SYSTEM AND METHOD FOR PROVIDING TRICK MODES

(75) Inventors: Nery Strasman, Ramat Gan (IL); Lior Assouline, Rishon Lezion (IL)

(73) Assignee: Bigband Networks Inc., Redwood City, CA (US)

( * ) Notice: Subject to any disclaimer, the term of this patent is extended or adjusted under 35 U.S.C. 154(b) by 1955 days.

(21) Appl. No.: 10/685,958

(22) Filed: Oct. 14, 2003

Related U.S. Application Data

(63) Continuation of application No. 10/339,527, filed on Jan. 8, 2003, now abandoned.

(60) Provisional application No. 60/362,344, filed on Mar. 6, 2002.

(51) Int. Cl.
*H04N 5/91* (2006.01)

(52) U.S. Cl. .................................. 386/68; 386/111

(58) Field of Classification Search .................. 386/48
See application file for complete search history.

(56) References Cited

U.S. PATENT DOCUMENTS 6,065,050 A * 5/2000 DeMoney .................. 709/219
6,434,141 B1 8/2002 Oz et al.

\* cited by examiner

*Primary Examiner*—Marsha D Banks Harold
*Assistant Examiner*—Daniel Tekle
(74) *Attorney, Agent, or Firm*—Reches Patents

(57) ABSTRACT

A method for facilitating trick plays includes receiving a request to change a display mode of a certain media stream; fetching a media stream associated data structure associated with the certain media stream; and processing the media stream associated data structure and in response providing a media stream that complies with the requested display mode. The media stream associated data structure may include pointers to independently decodable frames of the certain media stream, and the provision of the changed mode media stream includes transmitting at least some of said independently decodable frames, optionally with duplicating frames, having their timing information adjusted.

35 Claims, 8 Drawing Sheets

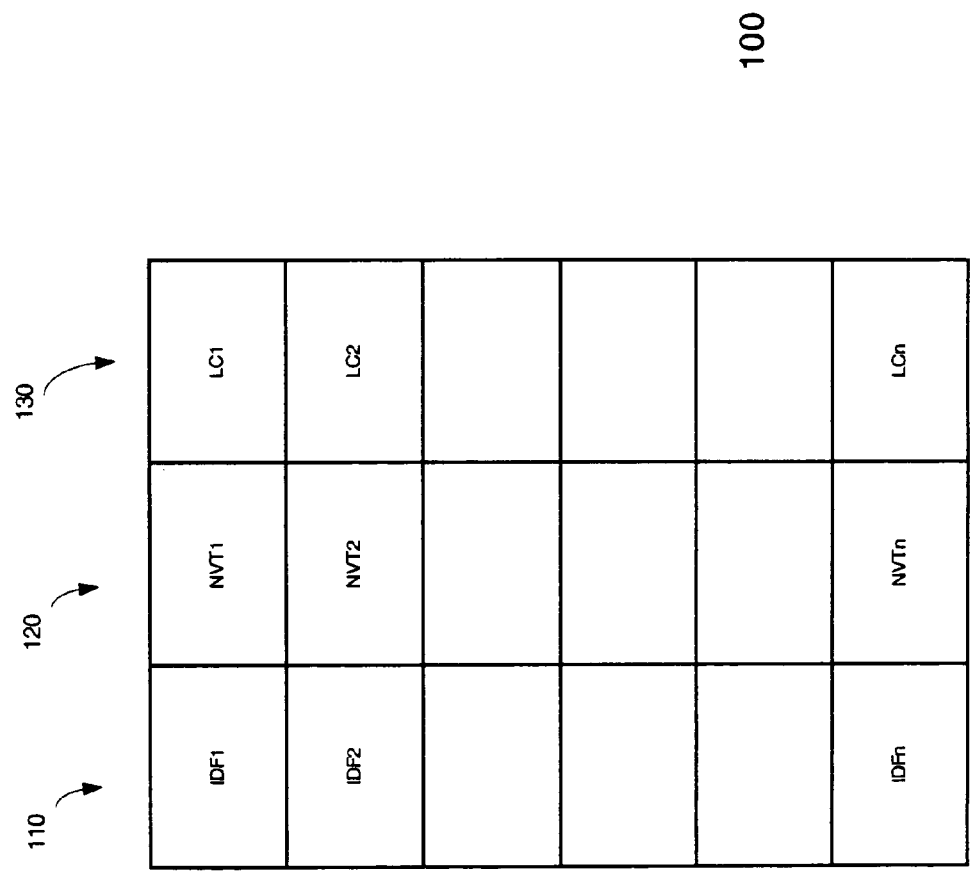

Method 400

Method 500

SYSTEM AND METHOD FOR PROVIDING TRICK MODES

RELATED APPLICATIONS

The present patent application is a Continuation of application Ser. No. 10/339,527, filed Jan. 8, 2003 now abandoned.

This application claims the priority benefit of U.S. provisional application 60/362,344, filed Mar. 6, 2002.

FIELD OF THE INVENTION

The invention is related to a system and method for providing trick modes and especially to a memory efficient system and method.

BACKGROUND

Video Cassette Recorders allow an end user to record an audio-visual program. When reviewing the recoded program the viewer may perform various operations such as fast forward (FF), fast reverse (REW), play (PLAY), slow motion (SM), slow reverse and pause (PAUSE).

Video on demand (VOD) systems are based upon a provision of programs to viewers over communication networks such as Hybrid Fiber Coax (HFC) networks. VOD providers are requested to allow end users to implement trick modes such as fast forward, rewind and the like. Due to various control, bandwidth and additional constraints VOD systems do not really perform FF and REW operations, but rather display a subset of frames out of the program to emulate FF and REW modes.

End users may also purchase a Personal Video Recorder (PVR) device that allows them to store a program in MPEG format, thus defining a stored program. The stored program may be manipulated to provide FF and REW modes. This solution is costly as it requires dedicated hardware and/or a subscription fee and also allows the end user to skip commercials. Accordingly, operators want to implement a PVR-like solution at their plant.

The Motion Pictures Experts Group (MPEG) has defined various methods for compressing and transmitting audio-visual information according to predefined timing schemes that allow displaying audio-visual content embedded within media streams. Raw video streams are provided to an MPEG encoder. An array of 8×8 pixels are DCT transformed to a block of 8×8 DCT coefficient blocks. The DCT coefficient blocks are assembled to macroblocks. The macroblocks are assembled to slices, that represent a horizontal strip of a picture. The strips are combined to make a picture. Each picture has a header. The picture header includes a picture type information, indicating whether the picture is I-frame, P-frame or B-frame. The picture header also includes timing information such as PTS and DTS that define when the picture is to be available to a viewer and when the picture is to be provided to a decoder, prior to said presentation. Pictures are arranged in a Group of Pictures (GOPs). A sequence of GOPs forms a video elementary stream. Video and audio elementary streams may be multiplexed to provide a transport stream or a program stream. In transport streams, the elementary streams are packetized to PES packets. Each PES packet includes a header that includes a stream ID and timing information.

I-frames are independent in the sense that they include the entire information that is required for displaying a picture. A P-frame is decoded in response to information embedded within a previous frame, while a B-frame is decoded in response to information embedded within both a preceding and succeeding frame.

Servers and data storage units are usually constructed in a manner that allows efficient storage and retrieval of data, but does not allow for retrieving data in a time sensitive manner. Accordingly, servers are not configured to retrieve and fetch data according to timing schemes such as MPEG compliant timing schemes.

U.S. Pat. No. 6,065,050 of DeMoney suggests a system and method for indexing between various video streams that include trick play streams and normal play media streams in a video delivery system. These various streams are encoded in accordance with different presentation rates. The system generates index look up tables between the normal play media stream and the trick play streams. The table enables indexing between the streams by utilizing a normal play time standard, and associating normal play time values to offsets within the corresponding video streams. The normal play time standard is driven by the timing information of the normal play media stream. In response to a user instruction to PLAY, FF or REW the video stream, the system switches between the normal play media stream and the corresponding trick play streams at predefined points that share the same normal play time value. The predefined points are stored in the look up table. U.S. Pat. No. 6,065,050 of DeMoney is incorporated herein by reference.

A disadvantage of such methods results from the need to generate and store multiple streams for allowing trick modes.

Thus, there is a need to provide a system and method for allowing efficient retrieval and storage of media streams and for allowing the retrieval and transmission of media streams according to predefined timing schemes to ensure the proper display of the audio-visual content embedded within the media streams.

There is also need to provide a system and method for allowing a service provider to provide FF, REW, PAUSE, SM services to an end-user. In that way, an end user that is coupled to the service provider's facilities may perform various operations such as fast forward (FF), fast reverse (REW) and play (PLAY).

SUMMARY OF THE INVENTION

The invention provides an apparatus, a method and a computer readable medium having code embodied therein for an efficient generation and transmission of trick play media streams. A normal play media stream is received/retrieved and analyzed to provide metadata that will enable the selective retrieval of certain frames out of the normal play media stream and the generation of a trick play media stream on the fly without the need to store this stream. The trick play media stream includes the certain frames, whereas timing information related to the certain frames is modified according to the characteristics of the trick play media stream. According to another aspect of the invention, the trick play media stream further includes concise duplicating frames.

The invention is also applicable for switching between a first trick play media stream and another trick play media stream or the normal play media stream.

The method may be implemented by various hardware and/or software entities. Such an entity may include a server that includes both routing capabilities and video pump capabilities, but may include only a portion of said capabilities. Some of the hardware components may be connected to each other via a network, but this is not necessarily so, as both server and video pump may be integrated.

A video pump may include a buffer, a streamer, a retrieval unit and a processor. The retrieval unit is operable to fetch frames from a storage unit to the buffer, to evaluate the status of the buffer (especially the amount of free memory space) and accordingly fill the buffer. The streamer is operable to transmit frames, such as trick mode frames, from the buffer and the processor is operable to access the frames stored within the buffer and to determine whether to alter timing information of stored frames and also determine how the streamer fetches and transmits frames from the buffer.

It is noted that the invention involves a reception (and storage) of a normal play media stream and does not require one to generate or to store additional video streams that are encoded according to different presentation rate, thus simplifying the encoding process and reducing the memory consumption.

The invention further provides a method for providing trick mode streams, the method including the steps of: (a) receiving a request to change a display mode of a certain media stream; (b) fetching a media stream associated data structure associated with the certain media stream; and (c) processing the media stream associated data structure and in response providing a media stream that complies with the requested display mode.

The invention also provides a computer readable medium having code embodied therein for causing an electronic device to perform the steps of: receiving a request to change a display mode of a certain media stream; fetching a media stream associated data structure associated with the certain media stream; and processing the media stream associated data structure and in response providing a media stream that complies with the requested display mode.

The invention additionally provides an apparatus for facilitating trick plays, the apparatus including a video pump adapted to access media stream associated data structures and selectively fetch portions of stored media streams, in response to contents of the media stream associated data structure, and to provide a trick play media stream.

The invention also provides an apparatus for providing trick mode streams, the apparatus operable to receive a request to change a display mode of a certain media stream; fetch a media stream associated data structure associated with the certain media stream; and process the media stream associated data structure and in response providing a media stream that complies with the requested display mode.

According to various aspects of the invention, the method includes generating or retrieving normal play time values for switching between a normal play media stream and a trick play media stream.

According to yet a further aspect of the invention the transmission of a trick play media stream includes selectively fetching frames of a normal play media stream, in response to a content of media stream associated data structure and in response to a characteristic of the trick mode media stream, optionally fetching duplicating frames in between consecutive selectively fetched frames, and transmitting the fetched frames to provide a trick play media stream.

BRIEF DESCRIPTION OF THE DRAWINGS

Further features and advantages of the invention will be apparent from the description below. In order to understand the invention and to see how it may be carried out in practice, a preferred embodiment will now be described, by way of non-limiting example only, with reference to the accompanying drawings, in which:

FIGS. 2A-2D, illustrate normal play media streams, trick mode media streams and media stream associated data structures, such as an indexing file, in accordance with embodiments of the invention.

DETAILED DESCRIPTION

Figure 1A:
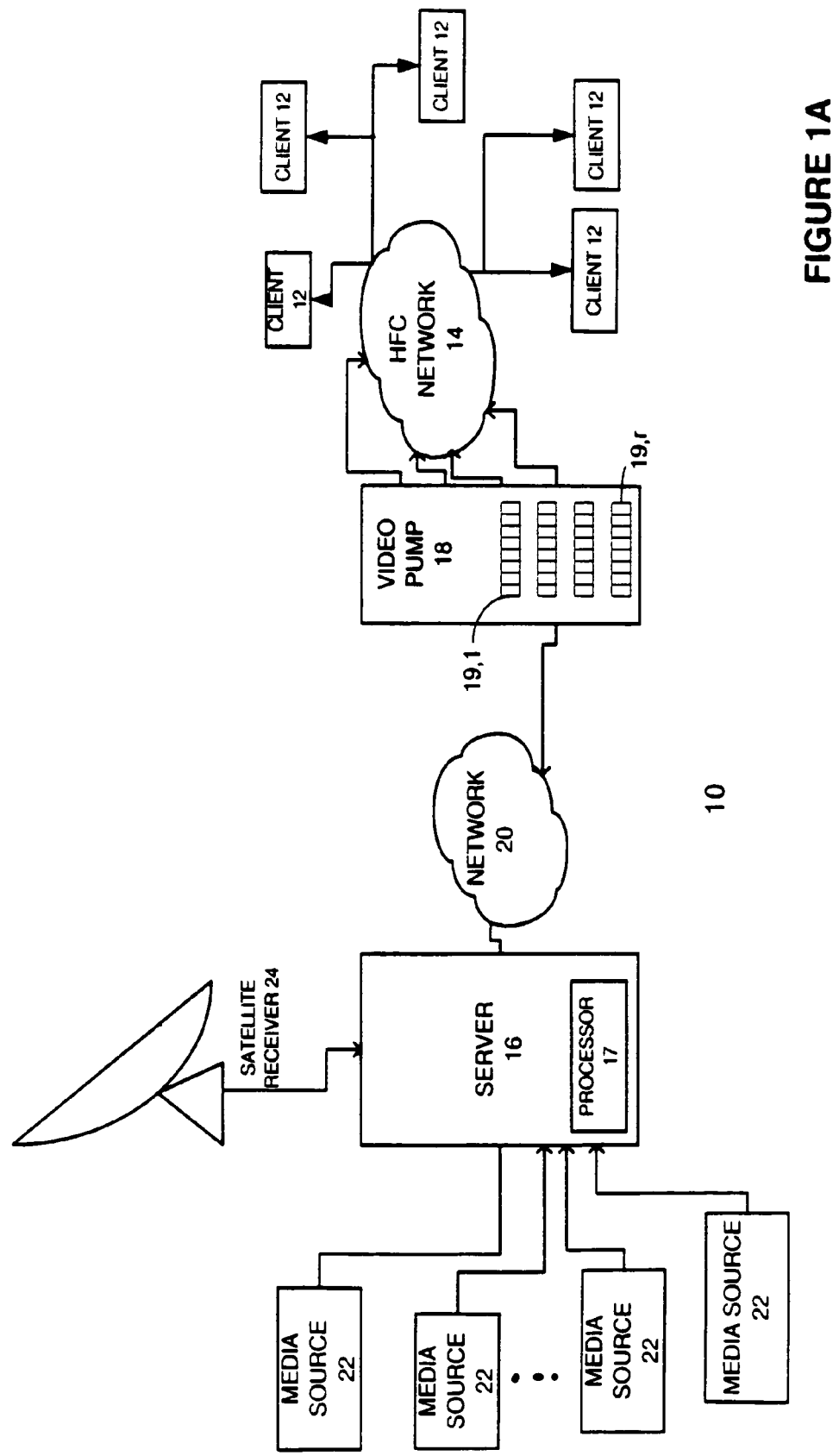
FIGS. 1A and 1B illustrate systems for providing trick modes, and their environments, in accordance with embodiments of the invention.
Figure 1B:
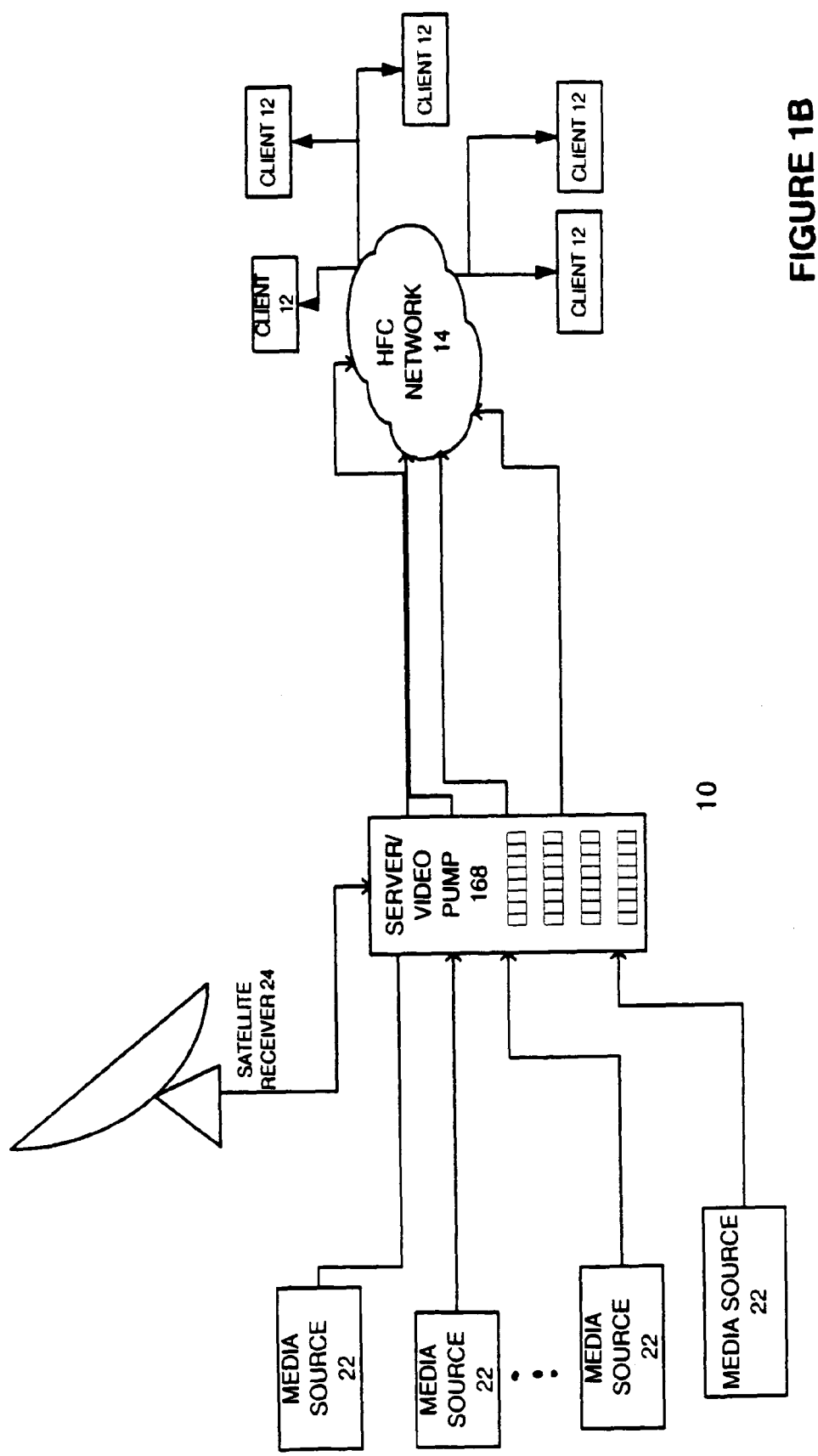

FIG. 1A illustrates system 10 for providing trick modes, in accordance with an embodiment of the invention. System 10 is connected to multiple end users (clients) 12 over a network, such as a broadband network and especially a Hybrid Fiber Cable (HFC) network 14. System 10 includes server 16 and video pump 18 that are connected to each other via network 20. It is noted that the server may be a media server and that it may also include video pump capabilities, as illustrated by server 16B of FIG. 1B.

Video pump 18 is operable to access media stream associated data structures, to determine which frames of the normal play media stream to fetch and to generate and determine which data to fetch from server 16 and when to transmit it according to MPEG timing. It is also able to fetch selected portions of the data stored at the server 16 such as to emulate trick modes, and is further operable to transmit the retrieved data over HFC network to end users 12. Server 16 includes a processor 17 for processing normal play media streams and generating media stream associated data structures.

It is noted that both upstream paths and downstream paths are established between system 10 and end users. Downstream paths are utilized for transmitting video streams, control and/or data from system 10 to end users 12, while upstream paths are utilized for transmitting control and/or data from end users to system 10. It is further noted that video streams may include video and audio information streams, and that upstream paths and downstream paths that are utilized for exchanging control and/or data are usually termed Out Of Band paths.

Server 16 may be coupled to multiple media sources 22, for receiving various types of video streams, such as Video On Demand video streams, or even receive live or almost live programs from media sources such as satellite receiver 24. Server 16 stores the received media streams.

Whenever a portion of a program is received by the server 16 it is operable to generate a media stream associated data structure, such as indexing file 100 of FIG. 2B, for allowing selective retrieval of portions of the stored program to emulate trick modes.

FIGS. 2A-2D illustrate a normal play media stream 34, indexing file 100 and a two trick play media streams 200 and 300, respectively. It is noted that normal play media stream 34 and indexing file 100 are stored at the video pump and/or server while the trick play media streams are generated and transmitted by video pump 18 without a need to previously store them.

Figure 2A:
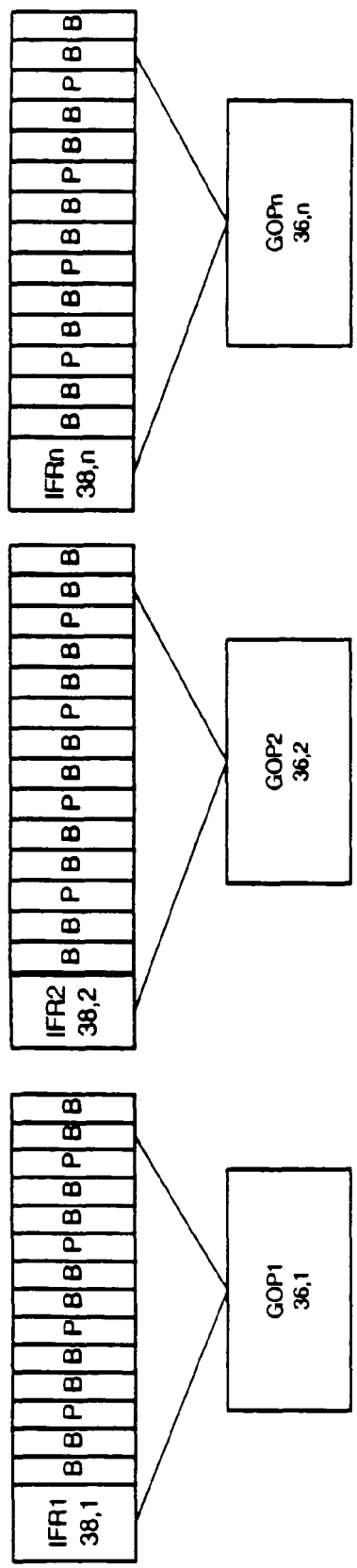

FIG. 2A illustrates a normal play media stream 34 that includes a sequence of Group Of Pictures (GOPs) GOP1-GOPn (denoted 36,1-36,*n*). Each GOP starts with an I-frame (IFR) (38,1-38,*n*), and includes multiple P-frames and B-frames. FIG. 2B illustrates indexing file 100 that includes pointers to said I-frames. The order of pointers within indexing file 100 corresponds to the order of the corresponding I-frames within normal play media stream 34. It is noted that indexing file 100 may be generated without fully encoding the normal play media stream 34.

Figure 2C:
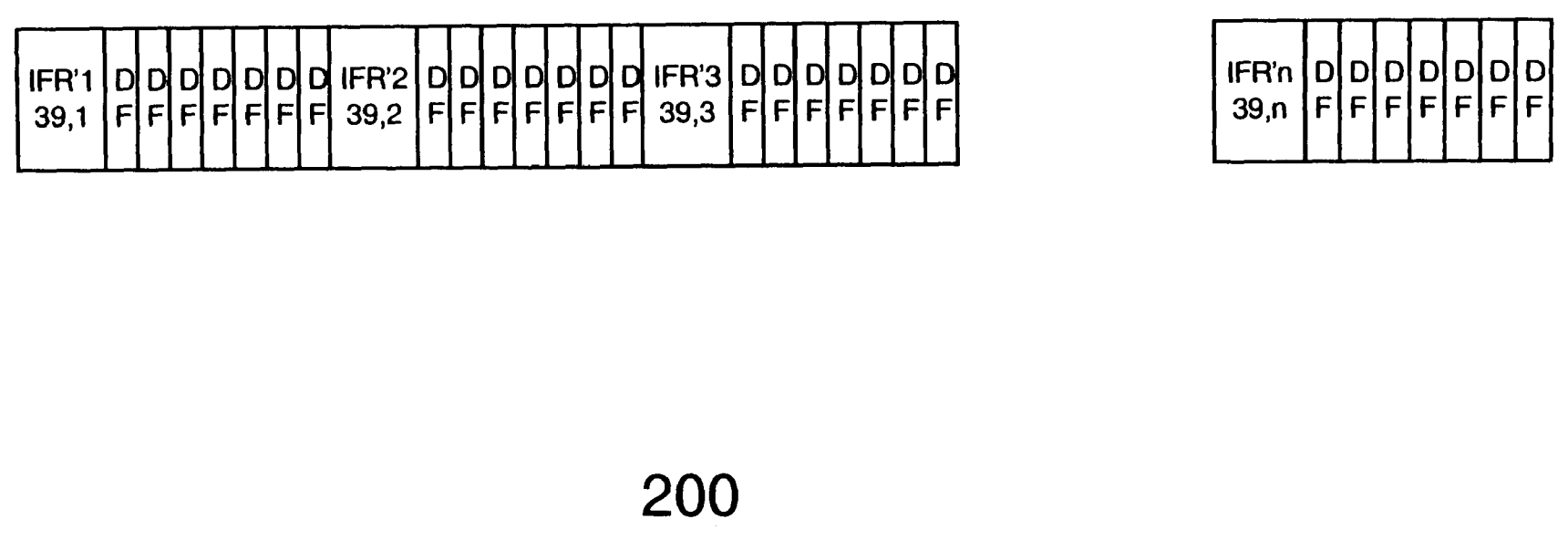
Figure 2D:
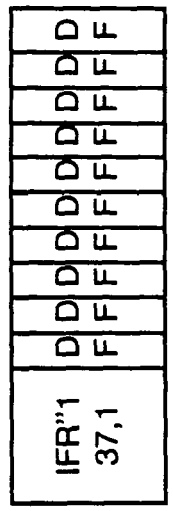
Figure 2D:
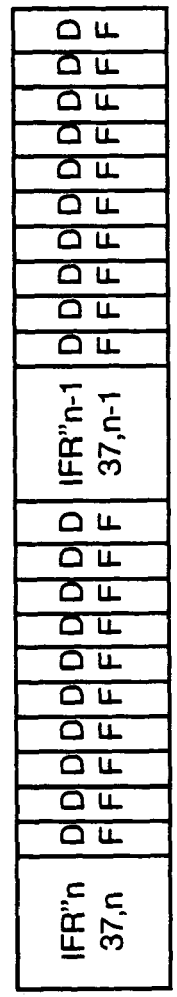

Referring to FIGS. 2C and 2D, each of first and second trick play media streams 200 and 300 is generated on-line (i.e., on-the-fly), by selectively retrieving I-frames, modifying their timing information and transmitting the I-frames having the modified timing information to a user. Both media streams include I-frames and duplicating frames. The duplicating frames (DFs) are retrieved, associated with timing information and transmitted to a user, along with I-frames. First trick mode media stream 200 includes DFs and I-frames IFR'1-IFR'n ($39,1$-$39,n$). Second trick modes stream 300 includes DFs and I-frames IFR"n-IFR"1 ($37,n$-$37,1$). The I-frames of normal play media stream 34, first trick play media stream and second trick play media stream include the same visual content but have distinct timing information.

According to an aspect of the invention the indexing file 100 further includes at least one of the following parameters: the length of each I-frame, the starting point of each I-frame, the end point of each I-frame.

Trick mode media stream 200 differs from trick mode media stream 300 by the number of DFs inserted between each pair of I-frames (ten instead of seven), and by the reverse order of I-frames, as trick mode media stream is a fast forward media stream while trick mode media stream 300 is a slower rewind media stream. The number of DFs to be retrieved and transmitted between each pair of consecutive I-frames determine the presentation rate of the transmitted trick mode stream.

FIG. 2B illustrates indexing file 100, in accordance with an aspect of the invention. Indexing file 100 includes three rows 110-130. The first row 110 stores I-frame identification information IDF1-IDFn. The second row 120 stores I-frame normal play time values NVT1-NVTn. The third row 130 stores the location of the I-frame LC1-LCn. Optionally, indexing file 100 may store either the location of a DF or may store the DF itself, as the DF is relatively concise. Most of these field values are retrieved from the normal play media stream.

According to yet another aspect of the invention multiple presentation rates are facilitated by transmitting non-consecutive I-frames, whereas the time offset between the transmitted I-frames determines the presentation rate.

Video pump 18 and/or server 16 may have multiple buffers, $19,1$-$19,r$ for storing multiple portions of media streams, and/or media stream associated data structures, according to instructions provided by end users (such as PLAY, FF, REW and the like). Video pump 18 provides the end user the requested media streams while requesting the server to provide consecutive portions of the media streams, or to provide a sequence of I-frames in accordance with the end-user's requests.

Figure 3A:
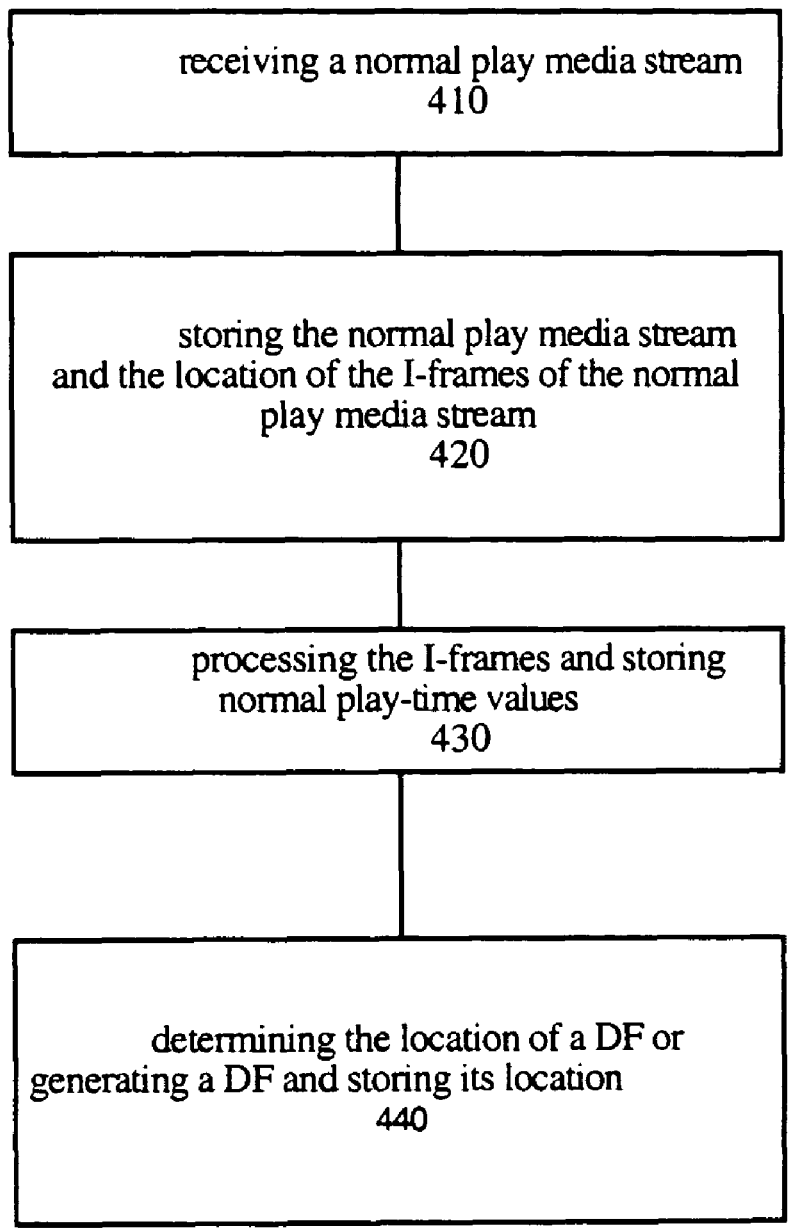
FIGS. 3A and 3B illustrate methods for providing and transmitting trick play media streams, in accordance with embodiments of the invention.

FIG. 3A, illustrates method 400 for generating an indexing file. Method 400 includes the steps of: (i) step 410 of receiving a normal play media stream, (ii) step 420 of storing the normal play media stream and further storing the location of the I-frames of the normal play media stream. I-frames may be identified by the picture type information within the picture headers of the normal play video stream. An I-frame may also identified by locating the start of each GOP, in cases where each GOP has only that single I-frame.

Step 420 may be followed by step 430 of processing the I-frames and storing normal play-time values and locations. Step 430 may be followed by step 440 of determining the location of a DF or generating a DF and storing its location.

Figure 3B:
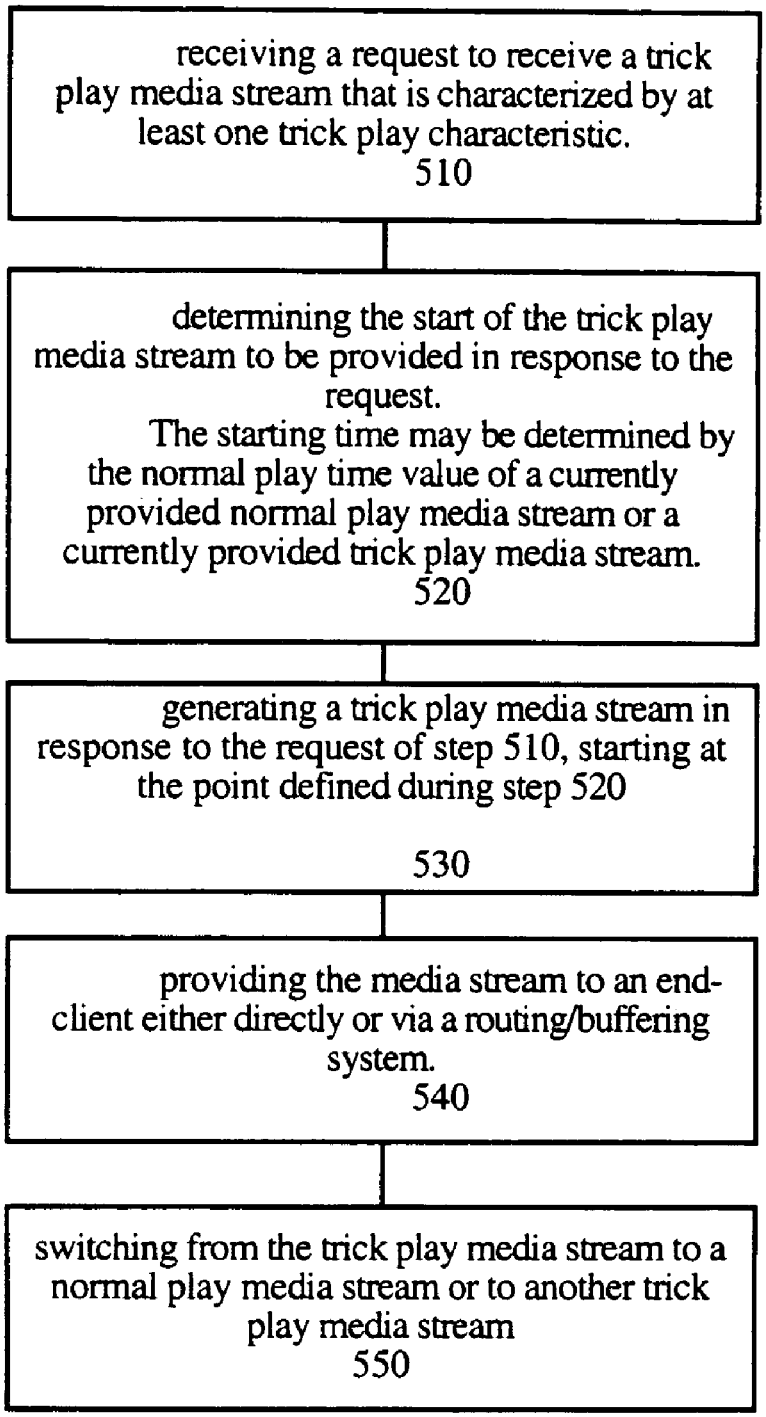

FIG. 3B illustrates method 500 for providing a trick play media stream. Method 500 includes step 510 of receiving a request to receive a trick play media stream that is characterized by at least one trick play characteristic. This characteristic may define the type of trick play (FF, REW, etc.) and the speed (×2, ×4, ×20, and the like).

Step 510 is followed by step 520 of determining the start of the trick play media stream to be provided in response to the request. The starting time may be determined by the normal play time value of a currently provided normal play media stream or a currently provided trick play media stream.

Step 520 is followed by step 530 of generating a trick play media stream in response to the request of step 510, starting at the point defined during step 520. Step 530 usually includes: determining the number of DFs between each I-frame in response to the speed of the requested trick mode play and end-user characteristics, fetching I-frames from locations that are pointed to by the indexing file, and altering timing information of I-frames and of DFs to provide a sequence of frames that form a trick play media stream.

Step 530 is followed by step 540 of providing the media stream to an end-client either directly or via a routing/buffering system.

It is noted that if DFs are not present (according to another aspect of the invention) the trick play media stream may include only I-frames. In such a case the amount of I-frames repetition determines the trick play media stream rate.

Step 540 may be followed by step 550 of switching from the trick play media stream to a normal play media stream or to another trick play media stream. This is usually done by locating the normal play time values of the frames.

According to an aspect of the invention video pump 18 is a Broadband Multimedia Router (BMR) such as one of the BMR family of BigBand Networks Inc., but this is not necessarily so. Some aspects of the Broadband Multimedia Router are illustrated at U.S. Pat. No. 6,434,141 of Oz et al., which is incorporated herein by reference.

The BMR may be connected to a server, such as server 16 of FIG. 1, and exchange various control messages, such as but not limited to Network File System (NFS) messages. It is noted that the BMR may also be connected to a media server and/or data server and exchange other types of control messages.

The BMR is further operative to perform various stream processing procedures such as multiplexing, re-multiplexing, rate adaptation, PID re-mapping, PCR re-stamping (e.g., jitter reduction procedures by updating the program clock reference fields), updating system information embedded in transport streams, and the like.

The BMR is able to direct a variety of packet types, even when a packet does not include destination address information. The BMR is further operative to generate a plurality of delayed media unit sequences, such as but not limited to delayed programs from a received live sequence of media units, such as but not limited to a live program. The BMR may have a server client for interfacing with server 16 via network 20, and may further have multiple buffers (such as buffers $19,1$-$19,r$ of FIG. 1) for storing portions of media streams and/or trick play streams and/or media stream associated data structures.

The BMR requests data stored in the server 16 in response to the request of a end user (normal mode, trick play mode) and MPEG timing constraints. The transmission of a trick play media stream will depend upon the timing information associated with its frames. Server 16 may store a normal play media stream as well as media stream associated data structures, such as indexing file 100. It is noted that the normal play media stream may be stored in a different device (such as a media source) than the media stream associated data structures.

The server 16 provides the requested portions that may be temporarily stored within BMR, multiplexed with other programs, re-multiplexed and PID re-stamped. An illustration of some of these functions is illustrated at U.S. Pat. No. 6,434,141 of Oz et al. that is incorporated herein by reference. It is noted that the BMR includes on the one hand a server compliant end user, for exchanging information with the server 16, while on the other hand it includes various control and management units that ensure the transmission of MPEG compliant streams.

It is further noted that a processor capable of generating the media stream associated data structures may be located within server 16 or within BMR.

The BMR is able to receive client requests to PLAY, FF, REW and the like and to switch between normal play media streams and trick modes by sending a request to server 16 to receive the requested stream and/or media stream associated data structure or by providing at least a portion of said stream, if it is already stored within one or more buffers out of 19,1-19,r.

It should be appreciated that the preferred embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

We claim:

1. A method for facilitating trick plays, the method comprising the steps of:
   receiving a media stream that comprises independently decoded frames and inter-frames; and
   analyzing the media stream and in response generating a media stream associated data structure that enables a transmission of a trick play media stream, wherein the media stream associated data structure comprises either one of a duplicating frame or a location of a duplicating frame; wherein a number of duplicating frames that are positioned between adjacent independently decoded frames determines a presentation rate of a trick play media stream that comprises duplicating frames and independently decoded frames.

2. The method of claim 1 wherein the media stream is MPEG compliant.

3. The method of claim 2 wherein the independently decoded frames are I-frames.

4. The method of claim 1 wherein the step of analyzing comprises locating I-frames, storing the location of the I-frames and retrieving timing information associated with the I-frames.

5. The method of claim 4 wherein the timing information comprises normal play time values.

6. The method of claim 1 wherein the media stream associated data structure comprises retrieval information for facilitating retrieval and transmission of the independently decoded frames.

7. The method of claim 1 wherein the media stream associated data structure comprises retrieval information for facilitating retrieval and transmission of the independently decoded frames and of duplicating frames.

8. A method for providing trick mode streams, the method comprising the steps of:

(a) receiving a request to change a display mode of a certain media stream;
   (b) fetching a media stream associated data structure associated with the certain media stream; and
   (c) processing the media stream associated data structure and in response providing a media stream that complies with the requested display mode, said processing comprises determining a required number of duplicating frames between each pair of independently decoded frames of a trick play media stream based on the requested display mode.

9. The method of claim 8 wherein the step (c) comprises:
   fetching independently decoded frames from locations that are pointed to in the media stream associated data structure.

10. The method of claim 9 further comprising altering timing information of independently decodable frames and of duplicating frames to provide a sequence of frames that form a media stream of a requested mode.

11. The method of claim 8 wherein the display mode is fast forward or rewind.

12. The method of claim 8 wherein the display mode is pause or slow motion.

13. The method of claim 8 wherein the display mode defines a presentation rate of the media stream.

14. The method of claim 8 wherein the step of fetching comprises a step of determining whether the media stream associated data structure is stored at a local storage medium or is stored in a remote server.

15. The method of claim 8 wherein a change between display modes comprises switching between media streams at predefined points having essentially the same normal play time values.

16. The method of claim 8 further comprising multiplexing the media stream with other media streams to provide a multiplex of media streams to end users.

17. The method of claim 16 further comprising associating with each media stream of the multiplex a unique PID such that each media stream is distinguishable from other media streams of the multiplex.

18. An apparatus for facilitating trick plays, the apparatus comprising a video pump adapted to access media stream associated data structures that include information related to independently decoded frames and duplicating frames of a stored media stream, selectively fetch portions of the stored media stream, in response to contents of the media stream associated data structures, determine the required number of duplicating frames between each pair of independently decoded frames of a trick play media stream based on the requested display mode and to provide the trick play media stream.

19. The apparatus of claim 18 wherein an entity is configured to receive a media stream that comprises independently decoded frames and inter-frames and to analyze the media stream and in response generate the media stream associated data structure that enables transmission of the trick play media stream; wherein the entity comprises the apparatus or a server coupled to the apparatus.

20. The apparatus of claim 19 wherein the media stream is MPEG compliant.

21. The apparatus of claim 20 wherein the independently decoded frames are I-frames.

22. The apparatus of claim 19 wherein the entity is operative to analyze the media stream by locating I-frames, storing the location of the I-frames and retrieving timing information associated with the I-frames.

23. The apparatus of claim 22 wherein the timing information comprises normal play time values.

24. The apparatus of claim 19 wherein the media stream associated data structure comprises retrieval information for facilitating retrieval and transmission of the independently decoded frames.

25. The apparatus of claim 19 wherein the media stream associated data structure comprises retrieval information for facilitating retrieval and transmission of the independently decoded frames and of duplicating frames.

26. An apparatus for providing trick mode streams, comprising:
means for receiving a request to change a display mode of a certain media stream;
means for fetching a media stream associated data structure associated with the certain media stream; and
means for processing the media stream associated data structure and in response providing a media stream that complies with the requested display mode, said means for processing comprises means for determining a required number of duplicating frames between each pair of independently decoded frames of a trick play media stream based on the requested display mode.

27. The apparatus of claim 26 wherein the means for processing comprises means for fetching independently decoded frames from locations that are pointed to in the media stream associated data structure.

28. The apparatus of claim 27 further comprising means for altering timing information of independently decodable frames and of duplicating frames to provide a sequence of frames that form a media stream of a requested mode.

29. The apparatus of claim 26 wherein the display mode is fast forward or rewind.

30. The apparatus of claim 26 wherein the display mode is pause or slow motion.

31. The apparatus of claim 26 wherein the display mode defines a presentation rate of the media stream.

32. The apparatus of claim 26 wherein the means for fetching comprises means for determining whether the media stream associated data structure is stored at a local storage medium or is stored in a remote server.

33. The apparatus of claim 26 wherein the apparatus is operable to change between display modes by switching between media streams at predefined points having essentially the same normal play time values.

34. The apparatus of claim 26 wherein the apparatus is further operable to multiplex the media stream with other media streams to provide a multiplex of media streams to end-users.

35. The apparatus of claim 34 wherein the apparatus is further operable to associate with each media stream of the multiplex a unique PID such that each media stream is distinguishable from other media streams of the multiplex.

* * * * *